United States Patent

Olsson

[11] Patent Number: 6,029,797
[45] Date of Patent: Feb. 29, 2000

[54] ENDLESS ARTICULATED CONVEYOR MOVABLE IN A THREE-DIMENSIONAL CURVED PATH

[75] Inventor: Lennart Olsson, Nyhamnsläge, Sweden

[73] Assignee: Frigoscandia Equipment AB, Helsingborg, Sweden

[21] Appl. No.: 09/051,987

[22] PCT Filed: Oct. 23, 1996

[86] PCT No.: PCT/SE96/01358

§ 371 Date: Nov. 18, 1998

§ 102(e) Date: Nov. 18, 1998

[87] PCT Pub. No.: WO97/15503

PCT Pub. Date: May 1, 1997

[30] Foreign Application Priority Data

Oct. 24, 1995 [SE] Sweden .................................. 9503725

[51] Int. Cl.[7] .................................................. B65G 13/02
[52] U.S. Cl. .......................... 198/778; 198/852; 198/802
[58] Field of Search .................................. 198/778, 852, 198/802

[56] References Cited

U.S. PATENT DOCUMENTS

| 967,424 | 8/1910 | O'Toole | 198/852 |
|---|---|---|---|
| 3,225,893 | 12/1965 | Currie . | |
| 3,240,316 | 3/1966 | Huffman et al. . | |
| 3,261,451 | 7/1966 | Roinestad . | |
| 3,285,394 | 11/1966 | Lanham et al. . | |
| 3,659,697 | 5/1972 | Brackmann et al. | 198/778 |
| 3,794,156 | 2/1974 | Brackmann et al. . | |
| 3,910,404 | 10/1975 | Henrekson . | |
| 3,938,651 | 2/1976 | Alfred et al. . | |
| 4,565,282 | 1/1986 | Olsson et al. | 198/778 |
| 4,603,776 | 8/1986 | Olsson . | |
| 4,875,343 | 10/1989 | Jeppsson . | |
| 4,934,517 | 6/1990 | Lapeyre | 198/852 |
| 4,941,567 | 7/1990 | Olsson . | |
| 5,346,057 | 9/1994 | Fisher et al. | 198/778 |

FOREIGN PATENT DOCUMENTS

| 2809861 | 9/1978 | Germany | 198/778 |
|---|---|---|---|
| 375 961 | 3/1975 | Sweden . | |
| 397435 | 1/1974 | U.S.S.R. | 198/778 |
| 2 148 827 | 6/1985 | United Kingdom . | |
| 2 160 841 | 1/1986 | United Kingdom . | |

Primary Examiner—Christopher P. Ellis
Assistant Examiner—Joe Dillon, Jr.
Attorney, Agent, or Firm—Browdy and Neimark

[57] ABSTRACT

An endless conveyor belt has a plurality of link members interconnected so that the conveyor belt is movable along a path (22) curved essentially in the plane of the conveyor belt and also about a guide roller whose axis is parallel to the plane of the conveyor belt. Product carriers (17) are supported successively by the link members and are essentially rigid in the plane of the conveyor belt; however, they are movable, together with the conveyor belt, about the guide roller. Each product carrier is longer, in the longitudinal direction of the extension of the conveyor belt, than each link member.

21 Claims, 2 Drawing Sheets

ENDLESS ARTICULATED CONVEYOR MOVABLE IN A THREE-DIMENSIONAL CURVED PATH

BACKGROUND

The present invention relates generally to conveyor belts, more specifically to endless conveyor belts comprising a plurality of link members, which are interconnected in such manner that the conveyor belt is movable along a curved path essentially in the plane of the conveyor belt and is also movable about a guide roller.

Such conveyor belts are disclosed in, for example, U.S. Pat. Nos. 3,938,651, 4,603,776 and 4,941,567. What the conveyor belts according to these publications have in common is that they consist of link members with side links, which permit the conveyor belt to follow a helical path, in which a superjacent conveyor belt part is directly supported by a subjacent conveyor belt part.

Other examples of conveyor belts of the type mentioned by way of introduction are disclosed in U.S. Pat. Nos. 3,225,893, 3,261,451 and 4,875,343. Also these conveyor belts can follow a helical path but are there at least on one side supported by separate supporting rails.

Regarding the above-mentioned conveyor belts, it is a general rule that the transition between a straight path and a curved path forces an extension of the conveyor belt on its one side and/or a shortening of the conveyor belt on its other side. This causes a relative motion between at least parts of the upper side of the conveyor belt and products carried by this upper side. Owing to this condition, certain products, such as pieces of dough, are difficult to transport by means of such a belt conveyor.

SUMMARY OF THE INVENTION

The object of the present invention therefore is to provide a conveyor belt of the type mentioned by way of introduction, which despite the capacity of being movable alternatingly along straight and curved paths should be usable for transport of such products as do not withstand any movement relative to the supporting base of the conveyor belt.

By arranging, according to the invention, a plurality of such product carriers, very fragile products can be moved by a conveyor belt along straight as well as curved paths and, in transitions between these, without any relative motion arising between the products and the supporting surfaces of the conveyor belt. To this end, the invention thus uses product carriers which in turn are supported successively by the link members, are essentially rigid in the plane of the conveyor belt, but moveable together with the conveyor belt about the guide roller, and each have a greater length in the longitudinal direction of the conveyor belt than each link member.

In its preferred embodiment, each product carrier has a length in the longitudinal direction of the conveyor belt which is at least as great as the length of two links members. Moreover, at its front part in the travelling direction of the conveyor belt, each product carrier is connected to its link member. The front part of the product carrier has essentially the same width as the link members, and the product carrier tapers backwards so as not to protrude beyond the link members along the curved path.

In one embodiment, the movability of the product carriers about a guide roller can be achieved by each product carrier being formed of a plurality of elements, which are articulated to each other transversely of the longitudinal direction of the conveyor belt. Each such element can have a length in the longitudinal direction of the conveyor belt which essentially corresponds with the length of a link member. The length of the element can also be smaller than the length of the link member, but not essentially greater than this.

In a further embodiment, each product carrier consists of a single element, for instance a fabric-like material, such as a cloth or a net, which is essentially rigid in its own plans, such that when pressing together or extending the link members in the plane of the conveyor belt, it moves merely relative to these link members. Consequently, no relative motion occurs between the fabric-like material of the product carriers and the products supported thereby.

The invention will now be described in more detail with reference to the accompanying drawings, in which.

Figure 1:
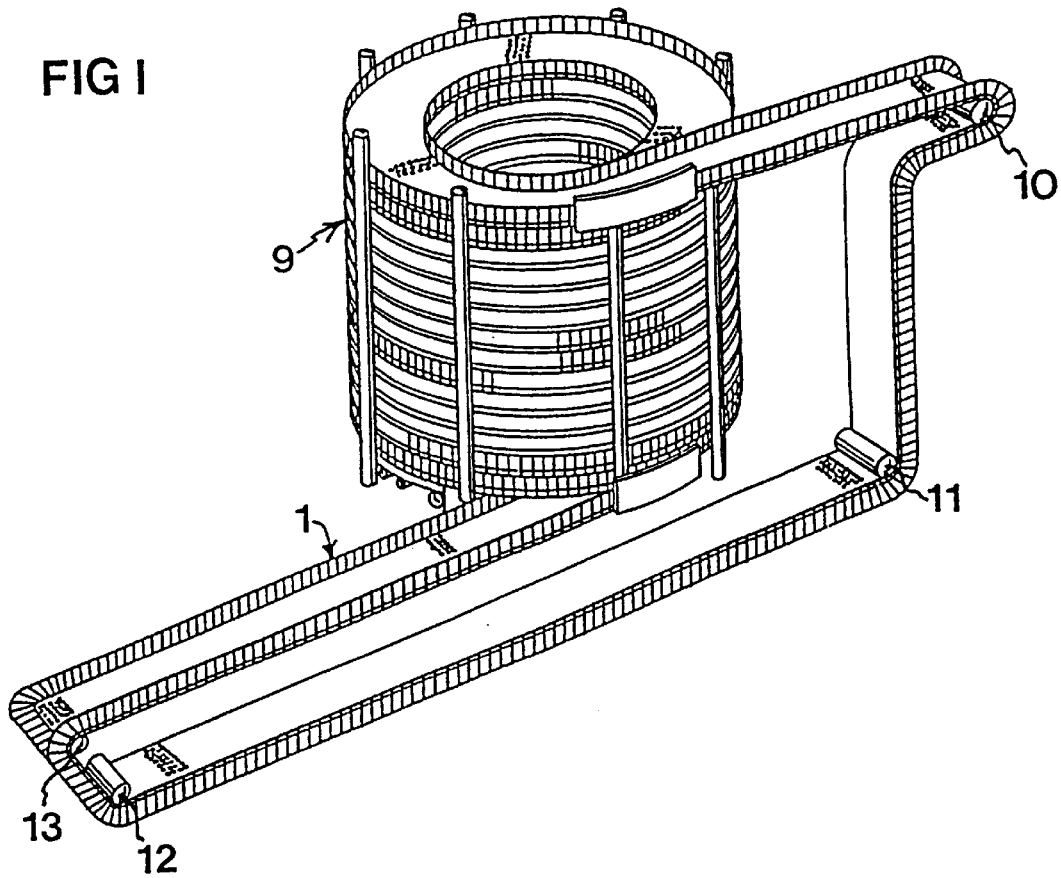
FIG. 1 is a perspective view of a conveyor belt, to which the present invention is applicable.
Figure 3A:
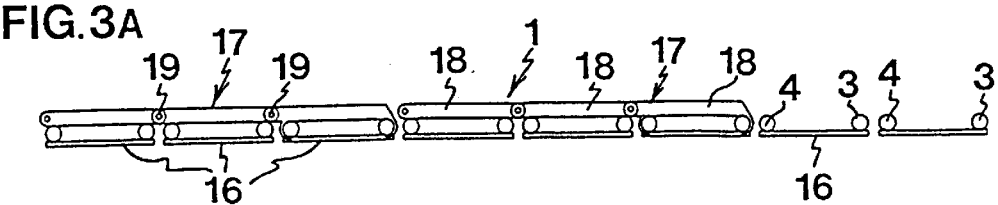
Figure 3B:
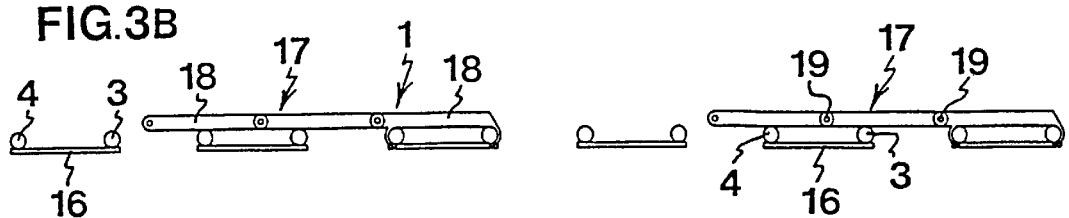
Figure 3C:
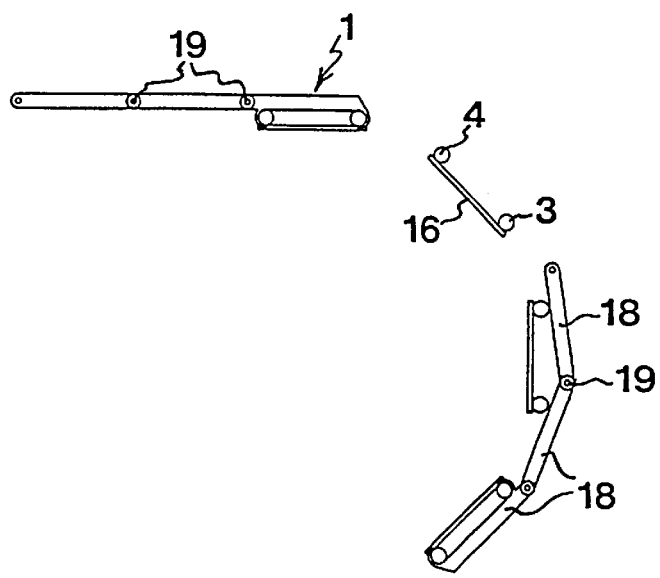
Figure 4:
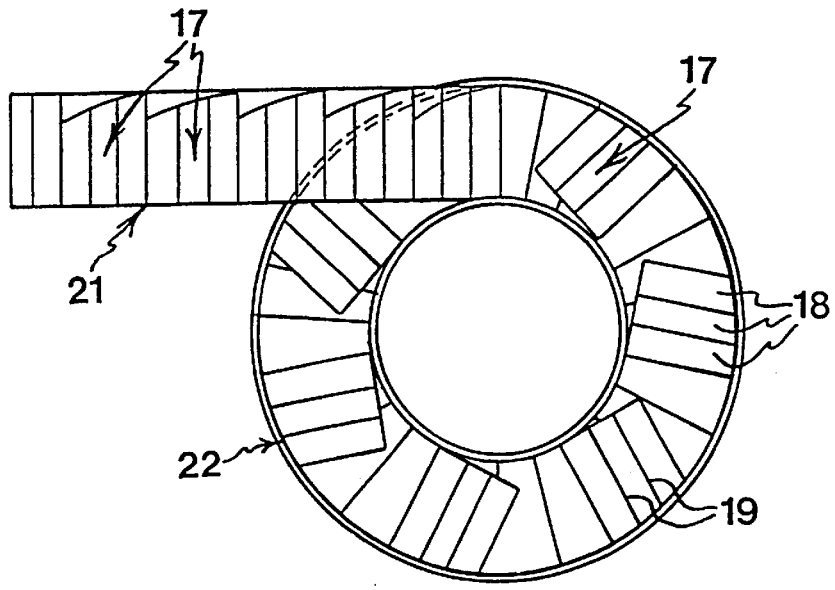

FIGS. 3A–C are schematic side views of an embodiment of a conveyor belt according to the present invention; and FIG. 4 is a top plan view of part of the conveyor belt in FIGS. 3A–C in a belt stack according to FIG. 1.

DETAILED DESCRIPTION

Figure 2:
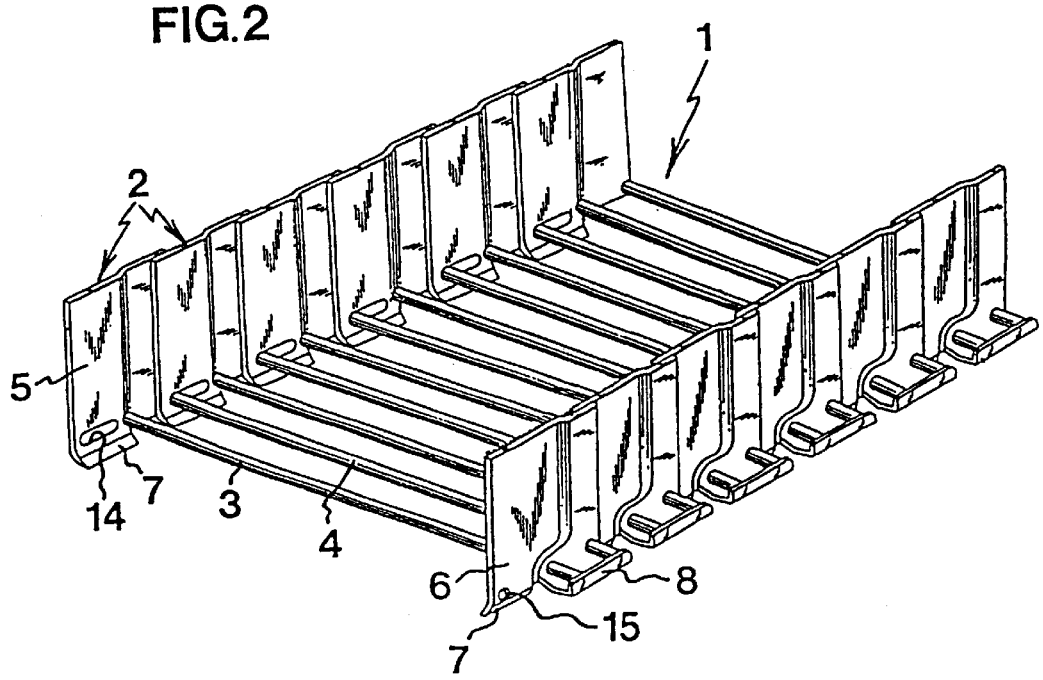
FIG. 2 is a perspective view of part of the conveyor belt in FIG. 1 on a larger scale.

The conveyor belt 1 shown in FIGS. 1 and 2 consists of a plurality of link members 2. Each link member 2 consists more specifically of two rods 3 and 4 extended transversely of the longitudinal direction of the belt and fixedly interconnected on each side of the conveyor belt by means of side links 5, 6 in the form of plates. The side links 5, 6 of each link member 2 each overlap a corresponding side link 5, 6 of one of the two neighbouring link members 2.

The side links 5, 6 have flanges 7 and 8 at the bottom, such that a portion of the conveyor belt 1 can be supported by a subjacent portion of the same conveyor belt 1. This is the case, for example, in FIG. 1 where the conveyor belt 1 along part of its length follows a helical path and forms a stack 9, in which each turn of the conveyor belt 1, except the lowermost turn, is supported by a subjacent turn of the conveyor belt 1. The link members 2 are interconnected in such manner that the conveyor belt 1 is movable along a curved path essentially in the plane of the conveyor belt, such as in the stack 9, and is also movable about a guide roller, for example transverse guide rollers 10–13, over which the conveyor belt 1 travels from the point of leaving the stack 9 until reentering the stack 9. This movability is achieved by means of holes 14, 15 in each side link 5, 6, through which holes 14, 15 extends the transverse rod 4 of a neighbouring link member 2. The hole 14 is shown as a hole which is elongate in the longitudinal direction of the conveyor belt 1, which means that the two side links 5 interconnected by means of the hole 14 and the transverse rod 4 are offset relative to each other in the longitudinal direction of the conveyor belt 1 and turnable relative to each other about the transverse rod 4. The hole 15 is circular and therefore permits only rotation of the side links 6 relative to each other about the transverse rod 4.

It will be appreciated that the holes 14 and 15 can change places, or that the hole 15 can have the same appearance as the hole 14. The relative position of the hole 14 and the transverse rod 4 in the longitudinal direction of the conveyor belt 1 is decisive of the possibility of moving the side links 5 towards or away from each other, or towards as well as away from each other. Depending on this mutual position, the conveyor belt 1 can, when passing from a straight path to a curved path, be subjected to merely a pressing-together at the inner side of the curved path or merely an extension at the outer side of the curved path, or be subjected to a pressing-together at the inner side as well as an extension at the outer side. In all cases, however, a relative motion will take place between each pair of neighbouring link members 2. The zigzag wires which usually enclose two or three neighbouring transverse rods in the prior-art conveyor belts of the type described above will then also move relative to each other.

FIG. 3 is a schematic side view of the conveyor belt 1 as part of an embodiment of the present invention. The side links 5 or 6 are thus very schematically shown as longitudinal rods 16, each fixedly connecting a pair of transverse rods 3, 4 to each other. For the sake of simplicity, the holes 14, 15 of the side links 5 or 6 have thus been omitted.

FIG. 3A shows the conveyor belt 1 with the link members 2 in pressed-together or not separated state, i.e. the appearance of the conveyor belt 1 along a straight path or on the inside of a curved path. A product carrier 17 is fixed to every third link member 2, Each product carrier 17 has three slate 18, which are articulated to each other about pins 19, which along the straight path are parallel to the transverse rods 3, 4. Each slat 18 extends across the conveyor belt 1 and thus is of essentially rectangular shape. Moreover, it is substantially rigid and is preferably foraminous so as to allow air to pass therethrough.

The fixing of the product carrier 17 to one of the link members 2 is accomplished by the fact that the slat 18, which is the foremost one in the travelling direction of the conveyor belt 1, comprises flanges 20, by means of which the slat 18 can be snapped on over the transverse rods 3, 4 to the link member 2.

The length of each slat 18 in the longitudinal direction of the conveyor belt 1 conforms with the centre distance between the link members 2 in FIG. 3A, i.e. each slat 18 has substantially the same length as one of the link members 2.

FIG. 3B illustrates the conveyor belt in FIG. 3A in extended or not pressed-together state along a straight path or along the outside of the curved path, in which latter case the Appearance of the conveyor belt 1 is shown merely along the actual outside of the curved path. As appears from FIG. 3B, the three slats 18 of the product carrier will be supported in a plane position, unchanged relative to the position in FIG. 3A, by two of the link members 2, which are moved apart relative to the position in FIG. 3A at least along the outer side of a curved path.

FIG. 3C shows the conveyor belt 1 in FIGS. 3A and 3B in extended or not pressed-together state along a path about a guide roller (not shown), e.g. one of the guide rollers 10–13 in FIG. 1. Here the product carrier 17 can accompany the conveyor belt 1 about the guide roller essentially in contact with the conveyor belt 1 thanks to the slats 18 being articulated to each other about the pins 19, which also in FIG. 3C extend parallel to the transverse rods 3, 4.

FIG. 4 illustrates the conveyor belt 1 according to FIG. 3 in a top plan view along a turn in such a stack as the stack 9 in FIG 1. Along a straight path 21, the product carriers 17 take the same position as shown in FIG. 3A, while along a curved path 22 inside the stack, they have been offset relative to the two link members 2 which support each product carrier 17 but which are not fixed relative to the product carrier 17. This relative motion is a consequence of the fact that the link members 2 supporting the product carrier 17 are either moved apart at the outer side of the curved path, as is the case in FIG. 4, or are pushed together at the inner side of the curved path.

In the embodiment of the inventive conveyor belt as shown in FIGS. 3 and 4, the product carriers are directly supported by the transverse rods 3, 4. The zigzag wires which in the known conveyor belt surround the transverse rods 3, 4 are thus not necessary but may be arranged on the inventive conveyor belt.

If the conveyor belt has the above-mentioned zigzag wires, a cloth or a net, or some other fabric-like material of metal, plastic or textile, or a flexible sheet can be used instead of the product carriers 17.

To prevent the product carriers 17 or other equivalent product carriers from protruding beyond subjacent parts of the conveyor belt 1 along curved paths, they taper backwards, as shown in FIG. 4, in case the curved paths require that the belt turn in one direction only.

Many modifications of the above-described embodiment of a conveyor belt are possible within the scope of the invention, as defined in the accompanying claims.

I claim:

1. An endless conveyor belt movable about a guide roller transverse to a longitudinal direction of the conveyor belt; the conveyor belt comprising:

a plurality of interconnected link members (2), the conveyor belt (1) being movable along a curved path (22) essentially in a plane of the conveyor belt and also about the guide roller (e.g. 10); and a plurality of product carriers (17), which are successively supported upon the link members (2), are essentially rigid in the plane of the conveyor belt (1), which are movable together with the conveyor belt about the guide roller (e.g. 10), and each having a greater length in the longitudinal direction of the conveyor belt than each link member.

2. The conveyor belt as claimed in claim 1, wherein the product carriers are not mutually interconnected.

3. The conveyor belt as claimed in claim 1, characterised in that in its front part in the travelling direction of the conveyor belt (1), each product carrier (17) is connected to its link member (2).

4. The conveyor belt as claimed in claim 3, characterised in that the front part of the product carrier (17) has essentially the same width as the link members (2), and that the product carrier tapers backwards so as not to protrude beyond the link members along the curved path.

5. The conveyor belt as claimed in claim 12, characterised in that each rigid element (18) has essentially the same length in the longitudinal direction of the conveyor belt (1) as one of the link members (2).

6. The conveyor belt as claimed in claim 1, characterised in that each product carrier is made of a material which is essentially rigid in its own plane.

7. The conveyor belt as claimed in claim 1, characterised in that the curved path (22) is a helical path.

8. The conveyor belt as claimed in claim 7, characterised in that each link member (2) comprises side links (5, 6) which are offset relative to each other in the longitudinal direction of the conveyor belt (1) at least at the outer edge of the helical path (22).

9. The conveyor belt as claimed in claim 8, characterised in that the side links constitute spacer members for supporting a superjacent part of the conveyor belt.

10. The conveyor belt as claimed in claim 1, characterised in that the length of each product carrier (17) in the longitudinal direction of the conveyor belt (1) is at least as great as the length of two link members (2).

11. The conveyor belt as claimed in claim 2, characterised in that each product carrier (17) consists of a plurality of rigid elements (18) which are articulated (19) to each other traversely of the longitudinal direction of the conveyor belt (1) to permit the product carrier to move together with the conveyor belt about the guide roller (e.g. 10).

12. The conveyor belt as claimed in claim 10, characterised in that the front part of the product carrier (17) has essentially the same width as the link members (2), and that the product carrier tapers backwards so as not to protrude beyond the link members along the curved path (22).

13. The conveyor belt as claimed in claim 12, characterised in that each product carrier is made of a material which is essentially rigid in its own plane.

14. The conveyor belt as claimed in claim 12, characterised in that each product carrier (17) includes a plurality of rigid elements (18) which are articulated (19) to each other transversely of the longitudinal direction of the conveyor belt (1) to permit the product carrier to move together with the conveyor belt about the guide roller (e.g. 10).

15. The conveyor belt as claimed in claim 14, characterised in that each rigid element (18) has essentially the same length in the longitudinal direction of the conveyor belt (1) as one of the link members (2).

16. The conveyor belt as claimed in claim 12, characterised in that each product carrier is made of a material which is essentially rigid in its own plane.

17. The conveyor belt as claimed in claim 16, characterised in that the curved path (22) is a helical path.

18. The conveyor belt as claimed in claim 17, characterised in that each line member (2) comprises side links (5, 6) which are offset relative to each other in the longitudinal direction of the conveyor belt (1) at least at the outer edge of the helical path (22).

19. The conveyor belt as claimed in claim 18, characterised in that the side links constitute spacer members for supporting a superjacent part of the conveyor belt.

20. An endless conveyor belt movable about a guide roller transverse to a longitudinal direction of the conveyor belt; the conveyor belt comprising:

a plurality of interconnected link members (2), the conveyor belt (1) being movable along a curved path (22) essentially in a plane of the conveyor belt and also about the guide roller (e.g. 10); and a plurality of product carriers (17), which are successively supported upon the link members (2), are essentially rigid in the plane of the conveyor belt (1), which are movable together with the conveyor belt about the guide roller (e.g. 10), and each having a greater length in the longitudinal direction of the conveyor belt than each link member;

wherein each product carrier (17) includes a plurality of rigid elements (18) which are articulated (19) to each other transversely to the longitudinal direction of the conveyor belt (1), whereby the product carrier is permitted to move together with the conveyor belt about the guide roller (e.g. 10).

21. An endless conveyor belt movable about a guide roller transverse to a longitudinal direction of the conveyor belt; the conveyor belt comprising:

a plurality of interconnected link members (2), the conveyor belt (1) being movable along a curved path (22)

a plurality of product carriers (17), which are successively supported upon the link members (2), are essentially rigid in the plane of the conveyor belt (1), which are movable together with the conveyor belt about the guide roller (e.g. 10), and each having a greater length in the longitudinal direction of the conveyor belt than each link member;

wherein the length of each product carrier (17) in the longitudinal direction of the conveyor belt is at least as great as a length of two link members; and wherein each product carrier (17) is connected to a link member thereof in a part of the product carrier which is frontal in a direction of travel of the conveyor belt (1).

* * * * *